S. V. TENCH.
CHAIN.
APPLICATION FILED OCT. 25, 1920.
1,381,519. Patented June 14, 1921.
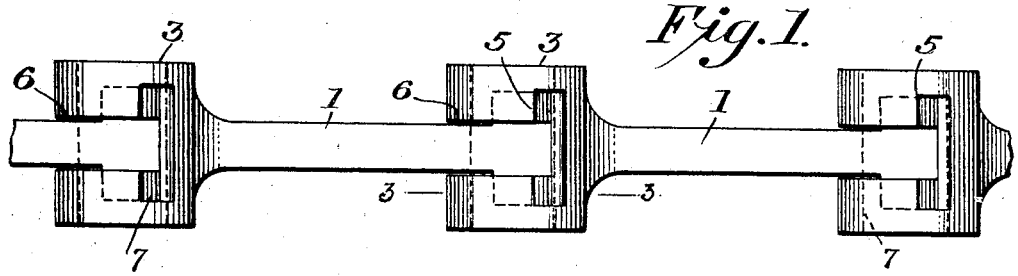
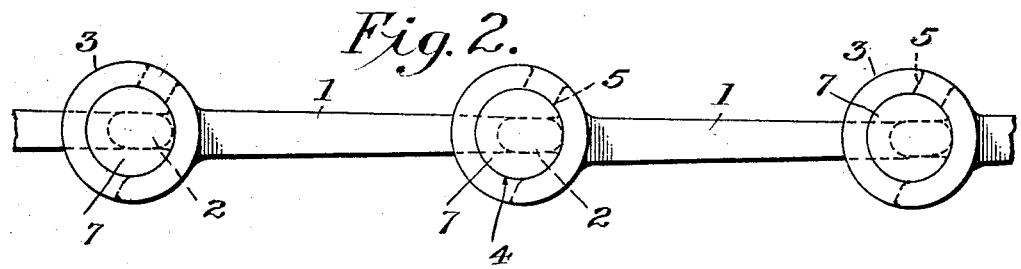
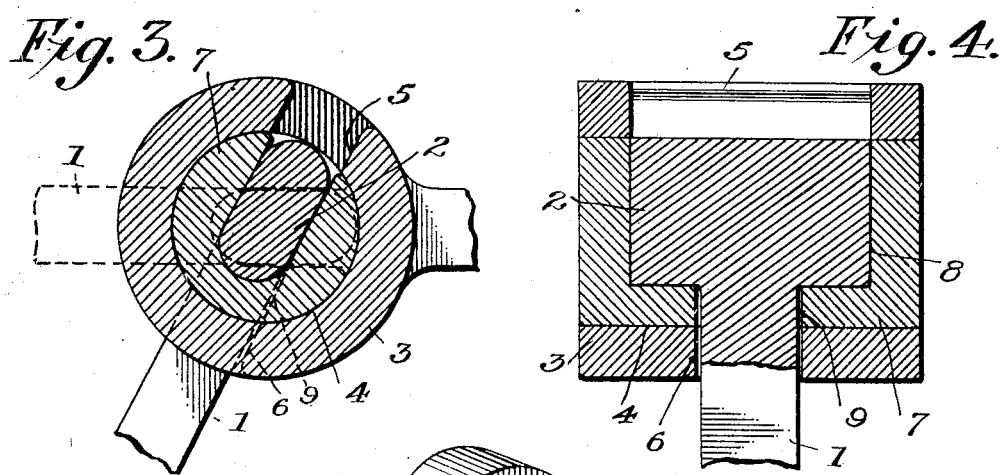
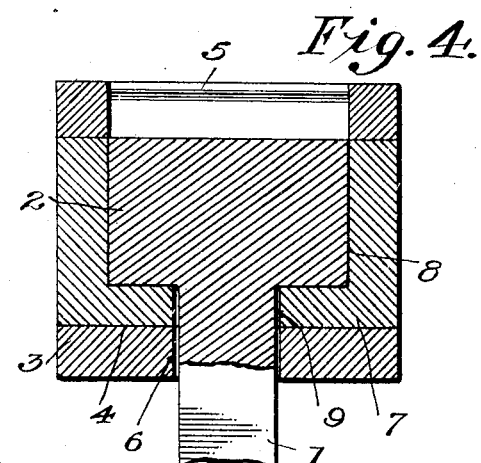
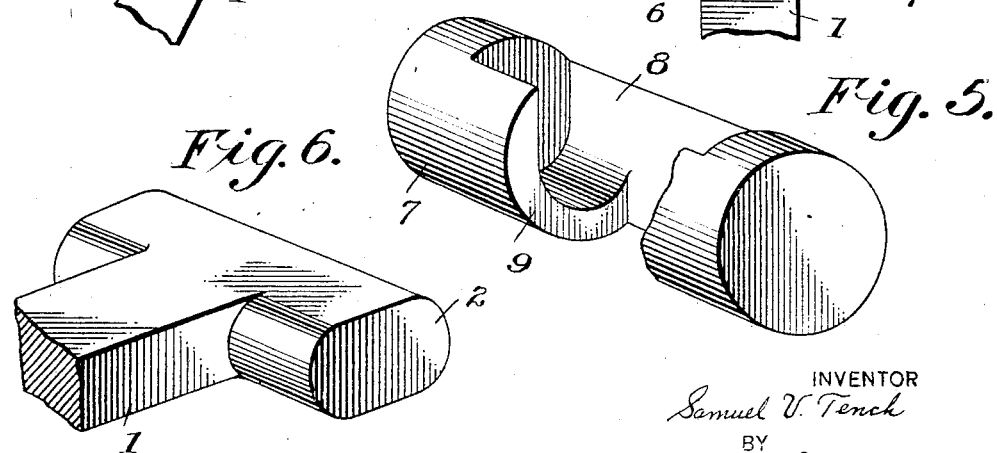
INVENTOR
Samuel V. Tench
BY
Ralph S. Warfield
ATTORNEY

UNITED STATES PATENT OFFICE.

SAMUEL V. TENCH, OF WILKES-BARRE, PENNSYLVANIA.

CHAIN.

1,381,519.                Specification of Letters Patent.     Patented June 14, 1921.

Application filed October 25, 1920. Serial No. 419,368.

*To all whom it may concern:*

Be it known that I, SAMUEL V. TENCH, a citizen of the United States, residing in the city of Wilkes-Barre, county of Luzerne, and State of Pennsylvania, have invented new and useful Improvements in Chains, of which the following is a specification.

More particularly, the present invention relates to chains having a single shank provided at one end with a cross-head, and at the other end with a knuckle to which the cross-head of the adjacent link is connected. A typical chain of this type now on the market is commercially known as the monobar chain, and my invention is designed as an improvement thereon.

One object is to provide a far simpler chain than the monobar chain, and one more easily assembled and disassembled.

To these ends, I provide a chain comprising a less number of parts; one that does not require as expensive machine work in its manufacture, and one which is readily disassembled when repair or replacement of new for old worn-out parts is necessary.

Furthermore, my improved chain is stronger than those heretofore devised, and requires less slack in assembling and disassembling, to enable such operations to be performed much more quickly than heretofore.

Chains of this nature are extensively used in and about coal mines, for conveying, and are subjected to the deleterious action of sulfur and other chemicals in the water in which the chains are used. Also, the ever-present fine grit and extraneous material works into the bearings and requires the substitution of new bearings for old and worn bearings.

Naturally a chain which permits such substitutions to be made in the shortest time and with the minimum expenditure of labor, so that delays in the operation of that portion of the plant in which the conveyer chain forms a prominent part, are reduced to the least possible period, is of material importance to the operator.

My invention accomplishes these and other objects, all of which will be more fully set forth hereinafter and particularly pointed out in the claims.

In the accompanying drawings, Figure 1 is a plan view, illustrating a section of a single link chain equipped with my invention;

Fig. 2 is a side view thereof;

Fig. 3 is an enlarged detail view in section transversely of a knuckle of one of the links on line 3—3 of Fig. 1;

Fig. 4 is an enlarged detail view in section taken longitudinally of the knuckle;

Fig. 5 is a perspective detail view of the removable bushing, part of which is broken away to show the slot; and Fig. 6 is a detail perspective view of the cross-head of a link.

The single link or monobar chains heretofore have been expensive to manufacture, and difficult to assemble and disassemble by reason of the number of parts, many of which necessitated machining operations in manufacture, and their arrangement or relative positioning when the links were to be connected or disconnected, often required the use of tools.

In my invention, the number of parts has been reduced to the minimum consistent with long wear, and the method of assembling and disassembling has been materially simplified, so that no tools are required, the adjacent links being adapted to be joined or disjointed by hand.

Each link of a chain constructed in accordance with my invention, comprises a bar 1 of any suitable shape in cross-section, such bar terminating at one end in a substantially T-shaped cross-head 2, and at the opposite end in a knuckle 3, which latter may be cylindrical in form and disposed transversely of the bar 1.

The cross-head 2 may be conveniently substantially oblong in shape, having its greatest width in a plane with the longitudinal axis of the bar 1. Preferably, the narrower side faces or edges of the cross-head are rounded, as shown in Fig. 6.

A round bearing opening 4 extends longitudinally through the knuckle 3, preferably from end to end thereof. In addition, the knuckle is provided with a longitudinally extending radial slot 5 leading from the bearing 4 to the exterior of the knuckle 3. The opposite ends of the longitudinal slot are closed, thereby leaving the ends of the knuckle bearing with completely circular walls of unimpaired strength. A circumferential slot 6 extends partway around the knuckle intermediate its ends, the circumferential slot communicating throughout its length with the bearing 4, one end of the circumferential slot 6 also leading into or communicating with the longitudinal slot 5 intermediate the ends of the latter, the opposite end of the circumferential slot 6 being closed and lying substantially in a plane with the rear or inner wall of the longitudinal slot, as shown in Fig. 3. The longitudinal and circumferential slots 5 and 6 together form a T-shaped slot, to permit the insertion of the cross-head 2 of the adjacent link into the bearing aperture 4 and its removal therefrom.

In connecting the links, the bar 1 of one link may be held at an angle to the knuckle 3 of the adjacent link, the cross-head 2 of the first-named link lying in a plane above the knuckle. With the parts in this position, the bar 1 of the first-named link is entered into the circumferential slot 6 of the adjacent knuckle until the bar contacts the closed end wall of the circumferential slot 6, and the rear or inner wall of the longitudinal slot 5, at which time, the cross-head 2 is in registry with the longitudinal slot 5, which is of a width and length sufficient to readily permit the passage of the cross-head edgewise therethrough.

The first-named link 1 is then drawn downwardly endwise to draw the cross-head 2 through the longitudinal slot 5 into the bearing 4, after which the first-named link is swung upwardly into line with the second-named link, the cross-head 2 turning in the bearing 4 and presenting its widest face to the slot 5.

It will be noted that when the chain is in use, the opposed laterally extending arms forming the cross-head 2 overlap the side walls of the bearing 4 in the knuckle on the opposite sides of the circumferential slot 5.

Reversing the foregoing operations in order, effects the disconnection of the links.

Attention is called to the fact that by assembling and disassembling the links according to the method just described, a lesser amount of slack is required in the chain than heretofore, as it is only necessary to turn the link to be disengaged, through an angular distance of less than 90 degrees, (as indicated in Fig. 3) to bring the narrower side or edge of the cross-head 2 into registry with the longitudinal slot 5.

The bar 1 of the link extends through and works in the circumferential slot 6, which is of sufficient length to permit the links to assume any of their normal angular positions relatively to each other when in operation. The chain will, however, be sufficiently taut when in use, as to prevent the links from assuming such relative angular positions as will enable their accidental disconnection.

I prefer to provide the bearing 4 with a bushing 7, cylindrical in general outline and insertible in the direction of its length into the bearing from either end thereof. The bushing 7 is cut out to form a longitudinally extending chamber 8 having closed ends, one or both side walls of the chamber being straight, to conform to the shape of the cross-head 2 to prevent relative rotation between the cross head and bushing.

A circumferentially extending arcuate slot 9 intersects the chamber 8 intermediate its ends, as shown in Fig. 5. When the bushing 7 is inserted in the bearing 4, the chamber 8 and its circumferential slot 9 are brought to register with the longitudinal slot 5, and the circumferential slot 6 of the knuckle, respectively, the bushing 7 having a rotatable fit in the bearing 4.

With the bushing in the position shown in Fig. 3, having the mouth or longitudinal opening of the chamber 8 in registry with the longitudinal slot 5 and the circumferential slot 9 in registry with the circumferential slot 6, the cross-head 2, when drawn into the bearing 4 enters and seats itself in the chamber 8 of the bushing 7, the opposite ends of the cross-head opposing the respective closed end walls of the chamber, and as the link 1 is swung into line with its adjacent link, its cross-head 2 turns the bushing 7 in the bearing 4 until, when the links are in line, the mouth of the bushing has been shifted to the approximate position shown in Figs. 2 and 3, and the cylindrical portion of the bushing closes the inner end of the longitudinal slot 5, to exclude dirt, dust and other extraneous material.

A chain constructed in accordance with the foregoing explanation is readily disassembled and assembled to permit the removal of old worn out bushings and the substitution of new bushings, or for other repairs, and the wear takes place on the bushing instead of between the walls of the knuckle and cross-head, so that the life of the chain is considerably lengthened and the cost of repairs and up-keep very decidedly reduced, it being necessary under ordinary conditions to disassemble the chain only for the purpose of renewing the bushings.

Another very important feature is that no fastenings of any kind are required to hold the links connected. Many chains require the use of pins, bolts, nuts and the like, which rust in place, thereby making them difficult to remove, or else work loose, and when removed, they often become mislaid.

In my arrangement, the bushing 7 locks the cross-head 2 against accidental removal, and the cross-head 2 and shank 1 in turn, hold the bushing against endwise displacement.

The closed ends of the bushing tend to prevent the entrance of dirt, dust and gritty material into the bearing through the ends thereof.

Changes may be made in the form and arrangement of the several parts set forth without departing from the spirit and scope of my invention.

What I claim as new, is:—

1. In a chain, the combination with links, each comprising a shank having a cross-head at one end thereof; of a knuckle at the opposite end of each shank; the knuckle having a bearing aperture therein, and formed with a longitudinally extending radial slot and a circumferential slot extending partway around the knuckle from the longitudinal slot, both slots adapted to communicate with the bearing; a bushing rotatably mounted in the bearing, the bushing being chambered longitudinally to form a seat for the cross-head of the adjacent link, which chambered portion is adapted to substantially register with the longitudinal slot in the knuckle, the bushing having a circumferential slot communicating with the chambered portion and adapted to substantially register with the circumferential slot of the knuckle; the shank of the next adjacent link being insertible laterally into the registering circumferential slots to bring the cross-head in line with the registered longitudinal slot of the head and the chambered portion of the bushing; and then being shiftable endwise to draw the cross-head through the longitudinal slot and seat it in the chambered portion of the bushing.

2. In a chain, the combination with links, each comprising a shank, having a cross-head at one end thereof; of a knuckle at the opposite end of each shank; the knuckle having a bearing aperture formed therein, and a circumferential, T-shaped slot communicating with the bearing; and a bushing rotatably mounted in the bearing, and chambered longitudinally to form a seat for the cross-head of the adjacent link; the bushing having a circumferentially extending slot communicating with the chambered portion thereof, the chambered portion of the bushing and its circumferential slot, adapted to substantially register with the T-shaped slot in the knuckle when connecting and disconnecting the links.

3. In a chain, the combination with links, each comprising a shank, having a cross-head at one end thereof; of a knuckle at the opposite end of each shank; the knuckle having a bearing aperture formed therein, and a circumferential, T-shaped slot communicating with the bearing; and a bushing rotatably mounted in the bearing, and chambered longitudinally to form a seat for the cross-head of the adjacent link; the bushing having a circumferentially extending slot communicating with the chambered portion thereof, the chambered portion of the bushing and its circumferential slot adapted to substantially register with the T-shaped slot in the knuckle when connecting and disconnecting the links; the ends of the bushing being solid or imperforate to afford strength and prevent the entrance of extraneous material to the bearing through the ends thereof.

4. In a chain, the combination with links, each comprising a shank, having a cross-head at one end thereof; of a knuckle at the opposite end of each shank; the knuckle having a bearing aperture formed therein, and a circumferential, T-shaped slot communicating with the bearing; and a bushing rotatably mounted in the bearing, and chambered longitudinally to form a seat for the cross-head of the adjacent link at least one wall of the chamber in the bushing being flattened; the bushing having a circumferentially extending slot communicating with the chambered portion thereof, the chambered portion of the bushing and its circumferential slot adapted to substantially register with the T-shaped slot in the knuckle when connecting and disconnecting the links; the cross-head adapted to loosely seat in the chambered portion of the bushing and having at least one flattened face to conform to the flattened wall of the chamber in the bushing, whereby to prevent relative rotation between the bushing and cross-head.

5. In a chain, the combination with links, each comprising a shank having a cross-head at one end thereof; of a knuckle at the opposite end of each shank, having a bearing formed therein, intersected by a slot; and a bushing removably and rotatably mounted in the bearing, the bushing being chambered to form a seat for the cross-head of the adjacent link and likewise intersected by a slot.

6. In a chain, the combination with adjacent links, the shank of one link terminating in a cross-head; of a knuckle on the adjacent end of the shank of the succeeding link, having a slot extending circumferentially partway around the knuckle and intersected by a slot extending longitudinally of the knuckle, the circumferential and longitudinal slots communicating with a bearing formed in the knuckle, to permit the insertion and removal of the cross-head of the adjacent link relatively to such bearing, the shank of the link extending through the circumferential slot in the knuckle.

7. In a chain, the combination with adjacent links, a cross-head on the shank of one link; a knuckle on the shank of the adjacent link, the knuckle having a bearing formed therein, and a longitudinally extending slot and a circumferentially extending slot communicating with the bearing from the exterior of the knuckle, the bearing adapted to accommodate the cross-head of the adjacent link, insertible and removable through the slots.

8. In a chain, the combination with adjacent links; and a cross-head on the shank of one of the links; of a knuckle on the shank of the remaining link, the knuckle having a bearing extending longitudinally thereof and open at one end, the bearing having a longitudinal slot with closed ends, communicating therewith from the exterior of the knuckle, and a circumferentially extending slot communicating with the bearing and with the longitudinal slot; and a bushing having imperforate end walls, insertible into the bearing, the bushing being longitudinally chambered, and circumferentially slotted to register with the longitudinal and circumferential slots in the knuckle, the cross-head of the adjacent link being insertible and removable relatively to the chamber in the bushing through the longitudinal slot of the knuckle.

9. In a chain, the combination with adjacent links, one of which is equipped with a cross-head; of a knuckle on the remaining link, having a bearing therein, and intersecting longitudinally and circumferentially extending slots communicating with the bearing from the exterior of the knuckle; and a bushing removably mounted and rotatable in the bearing, the bushing being longitudinally chambered to accommodate the cross-head of the adjacent link, and having a slot extending circumferentially partway around the bushing, to register with the circumferential slot in the knuckle.

10. In a chain adapted for assembly and disassembly without the use of extraneous fastenings; the combination of adjacent links, the shank of one of which is equipped with a cross-head having a greater width than thickness; a knuckle on the shank of the remaining link having a bearing formed therein to accommodate the cross-head, the knuckle having a longitudinally extending slot of a width sufficient to accommodate the thickness of the cross-head; the knuckle also having a circumferential slot extending partway therearound, and communicating at one end with the longitudinal slot, the longitudinal and circumferential slots communicating with the bearing.

11. In a chain adapted for assembly and disassembly without the use of extraneous fastenings, the combination of adjacent links, the shank of one of which is equipped with a cross-head having a greater width than thickness; a knuckle on the shank of the remaining link having a bearing formed therein to accommodate the cross-head, the knuckle having a longitudinally extending slot of a width sufficient to accommodate the thickness of the cross-head; the knuckle also having a circumferential slot extending partway therearound, and communicating at one end with the longitudinal slot, the longitudinal and circumferential slots communicating with the bearing; and a removable bushing rotatably mounted in the bearing, and having a longitudinal chamber to form a seat for the cross-head, the mouth of the chamber adapted to register with the longitudinal slot in the knuckle when assembling and disassembling the links; the bushing also having a circumferential slot extending partway therearound to register with the circumferential slot in the knuckle; the shank of the link equipped with the cross-head adapted to work along the circumferential slot in the knuckle; the cross-head, its shank, and the bushing adapted to form an interlocking means to prevent accidental displacement of the bushing and of the cross-head.

12. In a chain, the combination of adjacent links adapted for coupling and uncoupling without the use of extraneous fastenings, the shank of one of the links equipped with a cross-head having a width greater than its thickness; a knuckle carried by the shank of the adjacent link and having a bearing extending in a plane transverse to the shank; the knuckle having a peripheral slot with closed ends extending parallel to and communicating with the bearing, and a circumferential slot extending partway around the knuckle and communicating with the bearing, one end of the circumferential slot adapted to communicate with the peripheral slot which latter is of a width to accommodate the thickness of the cross-head; a bushing removably and rotatably mounted in the bearing and being chambered to substantially conform to the shape of the cross-head, the bushing being circumferentially slotted partway, which circumferential slot communicates with the chambered portion of the bushing, the chambered portion and the circumferential slot of the bushing adapted to register with the peripheral and circumferential slots of the knuckle, respectively, when assembling and disassembling the links, the cross-head adapted to turn the bushing in its bearing to a position to bring the mouth of the chambered portion opposite the imperforate portion of the knuckle and thus lock the cross-head and its link against accidental displacement, and close the inner end of the peripheral slot in the knuckle, the shank of one link extending through the registering circumferential slots of the knuckle and bushing, respectively, to prevent endwise displacement of the cross-head and bushing.

13. In a chain, the combination of links, each having a knuckle at one end, the knuckles each having an unobstructed bearing extending transversely therethrough, and being circumferentially slotted, the slot being T-shaped and communicating with the transverse bearing; a chambered bushing rotatable in the bearing, and being circumferentially slotted to substantially accord and register with the circumferential slot in the head when assembling and disassembling the links; the opposite end of each link being equipped with a cross-head adapted to be removably seated in the bushing of the adjacent link.

14. In a chain, the combination with links, each comprising a shank; of a knuckle at one end of each shank, and a cross-head at the opposite end thereof; the knuckles each being apertured transversely relatively to the shanks to form bearings, and being circumferentially and longitudinally slotted, which slots communicate with the bearings; circular bushings rotatable in the bearings, the bushings having imperforate ends to close the ends of the bearings, and being chambered to form seats for the cross-heads of the adjacent links, and having circumferentially extending slots to substantially register with the circumferential slots in the knuckles, to permit the insertion and removal of the cross-heads of the respective next adjacent links.

15. In a chain, the combination with links each comprising a shank; of a knuckle on one end of each shank; and a cross-head at the opposite end of each shank, each knuckle having a bearing aperture extending longitudinally thereof, and transversely relatively to the major axis of the shank, and being circumferentially and longitudinally slotted, the slots communicating with the bearing; a chambered bushing rotatable in the bearing, and being circumferentially slotted to substantially register with the circumferential slot in the head, the shank of the next adjacent link adapted to be inserted laterally into the circumferential slot in the knuckle and to be accommodated in the circumferential slot in the bushing, the cross-head adapted to pass through the longitudinal slot in the knuckle and seat itself in the chambered portion of the bushing, the cross-head operable to rotate the bushing in the bearing, and thereby cause the bushing to close the inner end of the longitudinal slot in the knuckle.

16. In a chain, the combination with adjacent links; and a cross-head on the shank of one of the links; of a knuckle on the shank of the remaining link, the knuckle having a bearing extending longitudinally thereof and open at one end, the bearing having a longitudinal slot with closed ends, communicating therewith from the exterior of the knuckle, and a circumferentially extending slot communicating with the bearing and with the longitudinal slot; and a bushing insertible into the bearing, the bushing being longitudinally chambered, and circumferentially slotted to register with the longitudinal and circumferential slots in the knuckle, the cross-head of the adjacent link being insertible and removable relatively to the chamber in the bushing through the longitudinal slot of the knuckle.

17. In a chain, the combination of adjacent links, each having a knuckle at one end with a round bearing aperture extending transversely thereof and being provided with longitudinal slots communicating with the bearing, and also provided with circumferential slots extending partway around each knuckle from a point intermediate the ends of the longitudinal slot, such circumferential slot communicating with the longitudinal slot and with the bearing; a chambered bushing removably insertible in the bearing, the mouth of the bushing adapted to register with the longitudinal slot in the knuckle; the bushing also provided with a circumferential slot extending partway therearound intermediate the ends of the chambered bushing and communicating with the chamber in the bushing, and adapted to register with the circumferential slot in the knuckle; the opposite end of each link having a head adapted to removably and non-rotatably seat in the chambered bushing.

18. In a chain, the combination of a link having a shank with a knuckle, equipped with a round bearing, a chambered bushing removably inserted in the bearing, both the bushing and knuckle having circumferential slots extending partway therearound and adapted to register, the slot in the knuckle adapted to communicate with the bearing, and the slot in the bushing adapted to communicate with the chamber formed in the bushing; and a link, the shank of which has a head removably insertible through an opening in the knuckle to non-rotatably seat in the chambered bushing, one end of the slot in the knuckle communicating with the opening.

19. In a chain, the combination of a link having a shank with a knuckle, equipped with a round bearing, a chambered bushing removably inserted in the bearing, both the bushing and knuckle having circumferential slots extending partway therearound and adapted to register, the slot in the knuckle adapted to communicate with the bearing, and the slot in the bushing adapted to communicate with the chamber formed in the bushing; and a link, the shank of which has a head of greater breadth than thickness, the head removably insertible through an opening in the knuckle communicating with the bearing to non-rotatably seat in the chambered bushing, the opening in the knuckle being smaller than the breadth of the head, one end of the circumferential slot in the knuckle being in communication with the opening, to accommodate the shank of the link.

SAMUEL V. TENCH.